United States Patent [19]
Tendick, Sr.

[11] Patent Number: 6,010,333
[45] Date of Patent: Jan. 4, 2000

[54] REFILLABLE BURNER ASSEMBLY

[75] Inventor: Donald W. Tendick, Sr., Brookfield, Wis.

[73] Assignee: Lamplight Farms Inc., Menomonee Falls, Wis.

[21] Appl. No.: 09/244,951

[22] Filed: Feb. 4, 1999

Related U.S. Application Data

[60] Provisional application No. 60/100,357, Sep. 15, 1998.

[51] Int. Cl.[7] ...................................................... F23D 3/18
[52] U.S. Cl. ............................................................. 431/324
[58] Field of Search ...................................... 126/320, 324

[56] References Cited

U.S. PATENT DOCUMENTS

| | | | |
|---|---|---|---|
| 3,994,672 | 11/1976 | Novak | 431/324 |
| 4,781,577 | 11/1988 | Stewart | 431/320 |
| 5,000,678 | 3/1991 | Thompson | 431/320 |
| 5,127,825 | 7/1992 | Tendick, Sr. | 431/320 |
| 5,395,234 | 3/1995 | Gutierrez | 431/324 |

*Primary Examiner*—Carroll Dority
*Attorney, Agent, or Firm*—Michael Best & Friedrich LLP

[57] ABSTRACT

The burner assembly include a container having a neck with a central opening through which a liquid fuel is introduced into the container and a one-piece cap removably mounted on the container neck. The cap has a crowned central portion with a central opening through which a tubular wick holder made from a crimpable material extends. The wick holder has an outer end through which the exposed outer end of a wick extends and an inner end including a radially outwardly extending flange which engages a first seating portion on the inner surface of the cap and surrounding the cap opening. The wick holder also has an intermediate portion including a crimped area which engages a second seating portion of the outer surface of the cap and surrounding the cap opening. This crimped area cooperates with the inner flange on the wick holder to hold the wick holder in place on the cap.

4 Claims, 1 Drawing Sheet

REFILLABLE BURNER ASSEMBLY

This application claims benefit of provisional application No. 60/100,357 filed Sep. 15, 1998.

BACKGROUND OF THE INVENTION

I. Field of the Invention

This invention relates to burner assemblies including a fuel container and a wick holder for covering the container and holding a wick.

II. Description of Prior Art

One type burner assembly used for decorative lamps and the like includes a metal canister containing a flammable liquid fuel, such as lamp oil, and a flameguard threaded onto or otherwise removably mounted on the fuel canister and holding a wick which extends into the liquid fuel. When the fuel is depleted, the flameguard is removed from the canister, the canister refilled with liquid fuel and the flameguard re-installed on the canister. Flameguards typically are made from a metal material. If mounted directly on a container made from a synthetic thermoplastic or thermosetting material, the flameguard can transfer heat from a burning wick to the neck of the plastic and cause the threads on the container to become misshaped.

Refilling metal canisters can be difficult and quite messy, particularly when the canister has a relatively small opening. An inexpensive disposable container made from a synthetic thermosetting or thermoplastic material and either disposed or reused is desirable for convenience sake and other reasons.

An inexpensive, flameguard made from a synthetic thermoplastic or thermosetting material also is desirable from a cost standpoint.

Representative prior art patents disclosing arrangements for mounting a wick holding cap on a fuel canister or container include Giangiulio U.S. Pat. No. 4,025,290, Olsen U.S. Pat. No. 4,728,286, Menten U.S. Pat. No. 4,805,076, Tendick U.S. Pat. No. 4,892,711, Thompson U.S. Pat. No. 5,000,678 and Tendick U.S. Pat. No. 5,127,825.

SUMMARY OF THE INVENTION

An object of the invention is to provide a burner assembly having a liquid fuel container and a cap member which serves as a wick holder and is removably mounted on the container.

Another object of the invention is to provide such burner assembly in which the cap member is made from a synthetic thermoplastic or thermosetting material.

Other objects, aspects and advantages of the invention will become apparent to those skilled in the art upon reviewing the following detailed description, the drawings and the appended claims.

In one aspect, the invention provides a burner assembly including a liquid fuel container, preferably made from a synthetic thermoplastic material, such as polyvinyl chloride, or a synthetic thermosetting material and including an upstanding neck having an opening for introducing a liquid fuel into the container and a one-piece cap member preferably made from a synthetic thermoplastic or thermosetting material, for covering the container opening and holding a wick. The cap member includes a circular top section having an outer peripheral portion, a raised central portion having a crowned outer surface and an inner surface, and a central aperture extending through the central portion for receiving the wick with one portion of the wick disposed in the liquid fuel when the cap member is mounted on the container. The outer and inner surfaces of the central portion respectively have first and second annular seating portions surrounding the central portion aperture. The wick is held on the cap member by an elongated tubular member made from a crimpable material and extending through the central portion aperture. One end of the tubular member has a radially outwardly extending annular flange which engages the second seat portion and the outer end is spaced outwardly from the central portion and the exposed end of the wick extends therethrough. An intermediate portion of the tubular member has a crimped area which engages the first seating portion and cooperates with the flange on the second end of the tubular member to hold the tubular member in place on the cap member.

DESCRIPTION OF PREFERRED EMBODIMENTS

Figure 1:
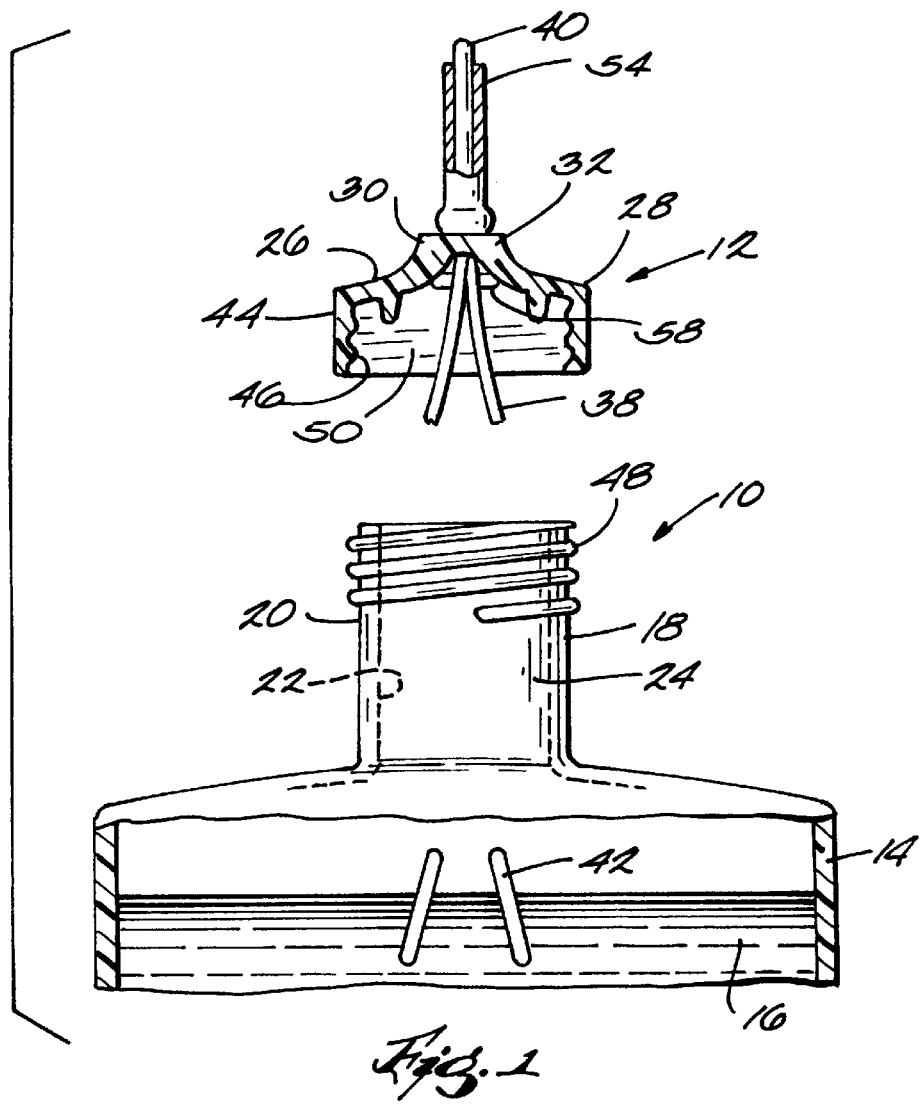
FIG. 1 is an exploded and partially sectioned view of a cap member and a fragmentary view of the upper portion of a fuel container for a burner assembly incorporating features of the invention.
Figure 2:
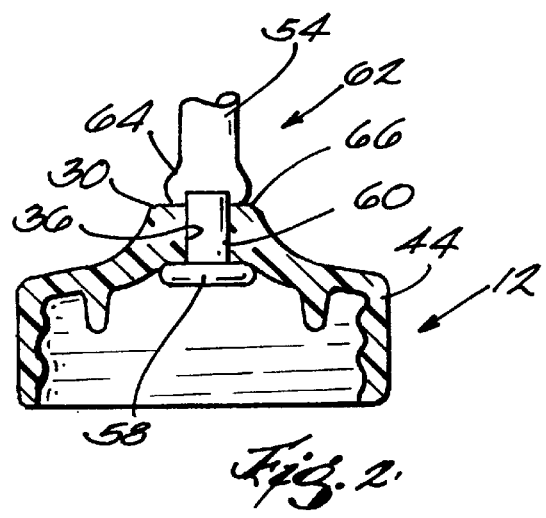
FIG. 2 is an enlarged view of the cap member with portions omitted to simplify illustration and a fragmentary view of the tubular member holding the wick.

The burner assembly 10 includes a one-piece cap member 12 mounted on a bottle or container 14, containing a liquid fuel 16 such as lamp oil.

The container 14 preferably is in the form of a bottle molded from a suitable, inexpensive synthetic thermoplastic material, such as polyvinyl chloride, or a synthetic thermosetting material. The container 14 has an upstanding neck 18 including an outer wall 20 and an inner wall 22 defining an opening 24 through which liquid fuel 16 is introduced into the container 14.

The cap member 12 preferably is made from a synthetic thermoplastic or thermosetting material, such as a phenolic or urea-based polymer, and has a circular top section 26 including an outer peripheral portion 28, a raised central portion 30 having a crowned outer surface 32 and a central aperture 36 extending through the central portion 30 for receiving an elongated wick 38. The wick 38 includes an upper portion 40 which is exposed for lighting and a lower portion 42 which extends into the liquid fuel 16 in the container 14 when the cap member 12 is installed on the container 14.

The cap member 12 also includes an annular skirt 44 connected to the peripheral portion 28 of the top section 26 and extending downwardly relative to the central portion 30. The skirt 44 has an inner wall 46 which fits over the container neck 18 when the cap member 12 is installed on the container 14 ready for use.

Various suitable means can be used for removably mounting and retaining the cap member 14 on the container neck 18. In the preferred embodiment illustrated, such means includes helical male threads 48 on the outer wall 20 of the container neck 18 and mating helical female threads 50 on the inner wall 22 of the cap member skirt 44.

The wick 38 is retained on the cap member 12 by an elongated tubular member 54 made from a permanently crimpable material, preferably a crimpable metal, and extending through the central aperture 36. One end of the tubular member 54 is located inside the cap member 12 and has a radially outwardly extending flange 58 which engages an annular seat 60 on the inner surface 34 of the central portion 30 and surrounding the aperture 36. The exposed upper portion 40 of the wick 38 extends through the other end of the tubular member 54 which is spaced outwardly from the central portion 30.

After the tubular member 54 has been inserted through the aperture 36 from the inside of the cap member 12 until the flange 58 engages the annular seat 60, an intermediate portion 62 adjacent the outer surface 32 of the central portion 30 is crimped to create a retainer portion 64 having a generally oblong cross section. The retainer portion 64 engages an annular seat 66 on the outer surface 32 surrounding the central aperture 36 and cooperates with the flange 58 to prevent, or at least minimize, axial movement of the tubular member 54 relative to the cap member 12.

The outside diameter of the tubular member 54 preferably is approximately the same as, but slightly less than the inside diameter of the central portion aperture 36 so as to prevent, or at least minimize, both lateral and rotational movement of the tubular member 54 relative to the cap member 12. The crimp forming the retainer portion 68 preferably provides a large enough internal opening for the exposed upper portion 40 with 38 to be pulled outwardly if the need arises during use. The wick 38 preferably is threaded through the tubular member 54 prior to crimping the intermediate portion 66.

When the liquid fuel in the container 14 has been used up, the cap member 12 is unscrewed from the container 14. If the depleted container is a disposable type, it is discarded, the cap member 12 is screwed onto a replacement container. If desired, the container 14 can be refilled with a liquid fuel and the cap member 12 replaced. The container 14 preferably is made from a transparent or translucent material so that the amount of liquid fuel in the container 14 can be determined without removing the cap member 12.

From the foregoing description, one skilled in the art can easily ascertain the essential characteristics of the invention and, without departing from the spirit and scope thereof, make various changes and modifications to adapt it to various uses.

I claim:

1. A burner assembly comprising
   a container for a liquid fuel including an upstanding neck having an opening for introducing a liquid fuel into said container;
   a one-piece cap member removably mounted on said container neck to cover said container opening, holding a wick; said cap member including
      a circular top section having an outer peripheral portion,
      a raised central portion having a crowned outer surface and an inner surface, and a central aperture extending through said central portion for receiving the wick with one portion of the wick disposed in the liquid fuel with the cap members mounted on said container and another portion extending through said aperture and exposed for lighting, the outer surface of said central portion including a first annular seating portion surrounding said aperture and the inner surface of said central portion including a second annular seating portion surrounding said aperture, and
      an annular skirt connected to and extending downward relative to said central portion;
   retainer means on said neck and said skirt for removably removing said cap member on said container;
   an elongated tubular member made from a crimpable material extending through said aperture for receiving the wick, said tubular member having a first end spaced outwardly away from said central portion and through which the exposed portion of the wick extends, a second end portion having a radially outwardly extending, annular flange which engages said second seating portion and an intermediate portion having a crimped area which engages said first seating portion and cooperates with the flange on the second end of said tubular member to hold said tubular member on said cap member.

2. A burner assembly according to claim 1 wherein said cap member is made from a synthetic thermoplastic or thermosetting.

3. A burner assembly according to claim 1 wherein said container is made from a synthetic thermoplastic or thermosetting material.

4. A burner assembly according to claim 2 wherein said container means includes helical male threads on the outer surface of said container neck; and helical female threads on the inner surface of said cap member annular skirt.

\* \* \* \* \*